UNITED STATES PATENT OFFICE.

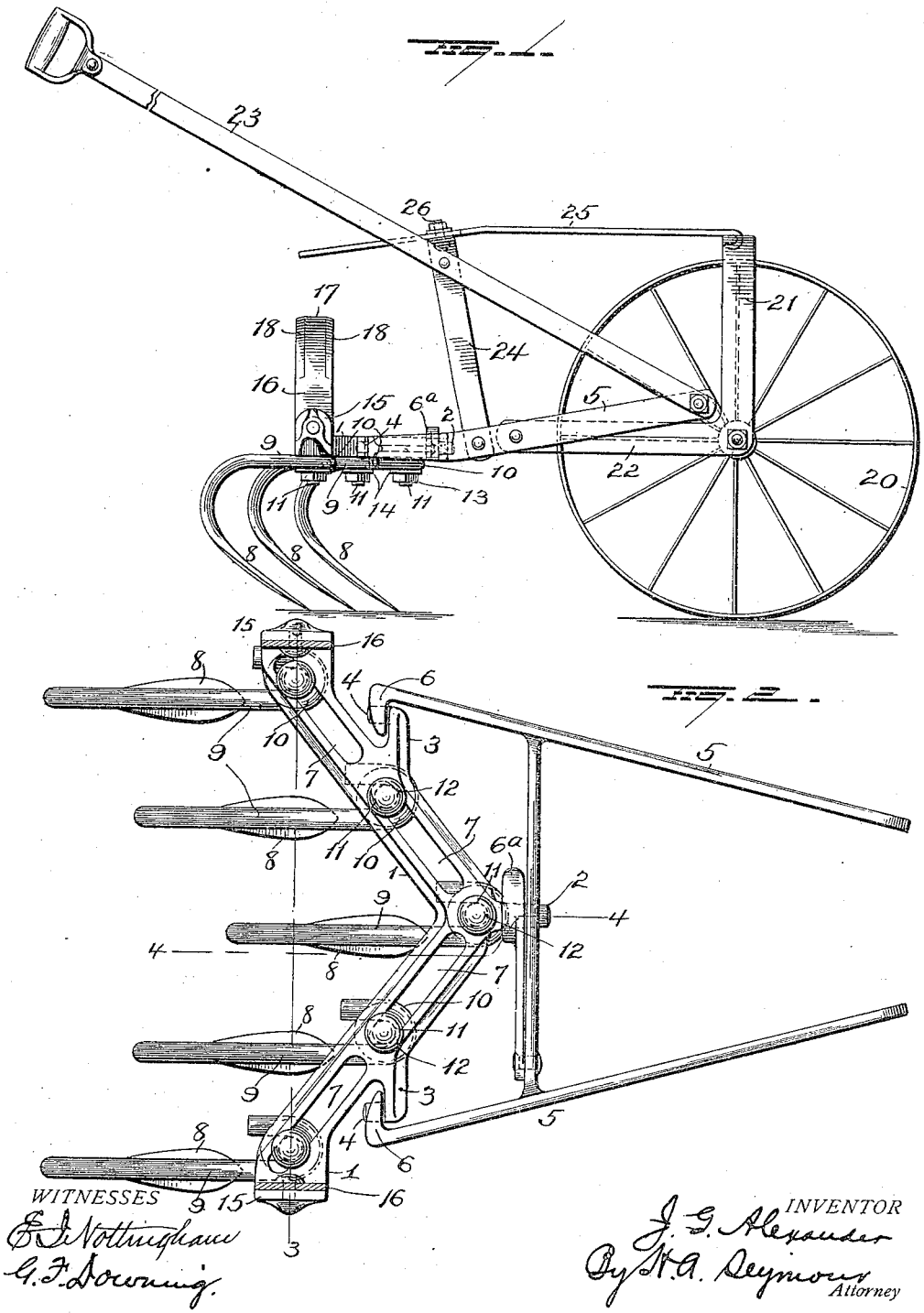

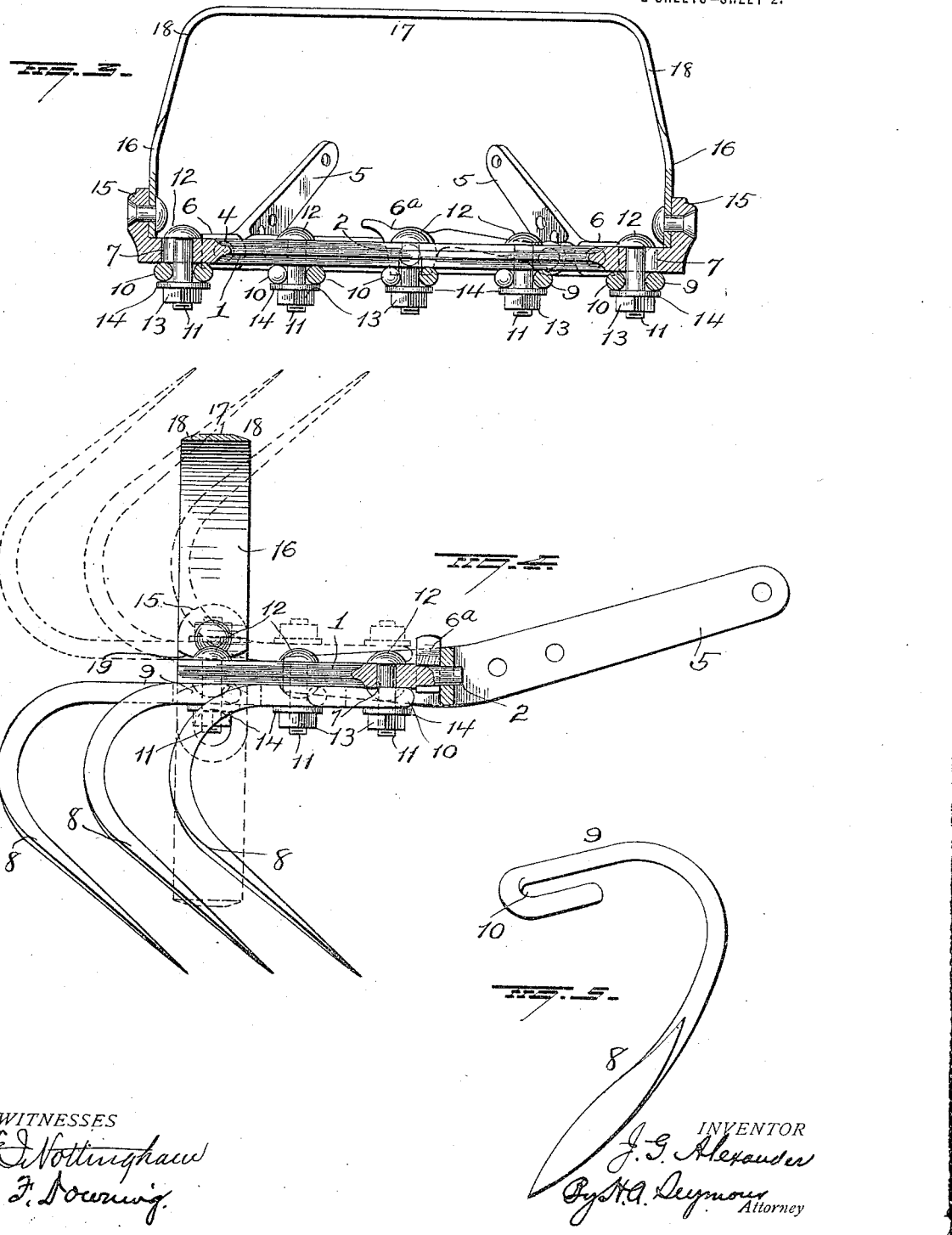

JAMES G. ALEXANDER, OF AMES, IOWA.

GARDEN-TOOL.

1,188,874. Specification of Letters Patent. Patented June 27, 1916.

Application filed July 7, 1915. Serial No. 38,538.

*To all whom it may concern:*

Be it known that I, JAMES G. ALEXANDER, a citizen of the United States, and a resident of Ames, in the county of Story and State of Iowa, have invented certain new and useful Improvements in Garden-Tools; and I do hereby declare the following to be a full, clear, and exact description of the invention, such as will enable others skilled in the art to which it appertains to make and use the same.

This invention relates to improvements in garden tools, and more particularly to a combined cultivator and hoe,—one object of the invention being to provide such a tool that it may be easily converted from one type to another without the use of a wrench and without removing any of the parts.

A further object is to so mount a double edged hoe upon the frame of the device that it may be caused to properly enter the ground when the tool is moved either forwardly or backwardly and so that it will clean itself of trash, etc.

A further object is to provide simple and efficient means for securing the cultivator teeth to the frame and permitting their ready adjustment.

A further object is to provide a garden tool of the class mentioned, which shall be strong and durable in construction; which may be easily adjusted and which shall be efficient in operation.

With these and other objects in view, the invention consists in certain novel features of construction and combinations of parts as hereinafter set forth and pointed out in the claims.

In the accompanying drawings; Figure 1 is a view showing an embodiment of my invention; Fig. 2 is a plan view; Fig. 3 is a section on the line 3—3 of Fig. 2; Fig. 4 is a section on the line 4—4 of Fig. 2, and Fig. 5 is a detail view of one of the cultivator teeth.

1 represents a horizontally disposed V-shaped frame having a forwardly projecting pintle 2 at its apex, and each member of said frame is provided at points between their ends with lateral arms 3 having rearwardly projecting pintles 4. The pintles 2 and 4 serve as connecting means for the V-shaped frame to a forward frame 5, the rear ends of the side bars of the latter being provided with inwardly projecting perforated ears 6 to receive the pintles 4, and the cross bar of said forward frame being perforated for the reception of the pintle 2. It will thus be seen that the V-shaped frame is reversible (for a purpose hereinafter explained), and to permit said frame to be reversed without completely removing it from the forward frame, the pintle 2 is made of greater length than that of the pintles 4, so that the V-shaped frame may be moved forwardly a sufficient distance to disengage the pintles 4 without completely withdrawing the pintle 2. The V-shaped frame may then be turned on the pintle 2, and after having been reversed, it may be moved rearwardly to again engage the pintles 4 with the forward frame. In order to lock the frame 1 in the position to which it may be adjusted, a latch $6^2$ is pivoted to the cross bar of the forward frame and engages over the pintle 2 between the apex of the frame 1 and the cross bar of the forward frame.

The respective bars or members of the V-shaped frame 1 are made with elongated slots 7 for the accommodation of fastening devices for cultivator teeth 8 and at the apex of said frame, a single hole may be provided for the same purpose.

Each cultivator tooth is made with an approximately horizontal shank 9,—the forward end of which is bent upon itself to form an open loop 10. The looped or hooked end of each tooth shank rests against the flat under surface of the frame 1 and a bolt 11 passes through the loop 10 of the shank and through one of the openings in the frame 1,—each bolt being provided on its upper end with a head 12 and threaded at its lower end for the reception of a nut 13,—between which latter and the loop or hook 10 of the tooth shank, a disk or washer 14 is disposed. In this manner, simple and substantial means are provided for securing the cultivator teeth rigidly to the V-shaped frame, and at the same time, permits their adjustment forwardly or backwardly, or laterally with relation to each other, without completely removing a tooth from the frame.

At the outer ends of the members of the V-shaped frame, ears 15 are provided, and to these ears, the arms 16 of a hoe or scraper blade 17 are pivotally connected. This hoe or blade is made with two cutting edges 18—18 and the arms 16 (which are preferably rounded at their pivoted ends, as at 19) are pivoted to the ears 15 at such distance from the upper face of the frame 1 as will permit but a limited movement of the hoe. The movement of the hoe on its pivotal connection with the frame will, however, be sufficient to cause either edge of the hoe to be properly disposed to take into the surface of the ground.

When the frame 1 shall have been reversed (in the manner previously explained) from the position shown in Fig. 1, so that the hoe will be brought into operative position, it will be caused to properly engage the ground when the tool is moved either forwardly or backwardly and said hoe will (by reason of its pivotal connection with the frame) be automatically adjusted to proper cutting relation to the ground when the direction of travel of the tool is reversed. By such arrangement, the hoe is not only double acting, but will be self-cleaning during the travel of the tool first in one direction and then the other.

The forward end of the tool is supported by a wheel 20 mounted in an arch 21, said arch being provided with rearwardly projecting arms 22 pivotally attached at their rear ends to the side bars of the forward frame 5. Should it be desired to provide two wheels instead of one, it is apparent that such wheels may be mounted at the end of each depending member of the wheel arch 21.

Handle bars 23 are connected at their forward ends to the forward ends of the bars of the frame 5, and rearwardly of their forward ends to the upright members of a frame arch 24, the lower ends of the upright members of said frame arch being attached to the frame 5 rearwardly of the attachment of the wheel arch arms 22 thereto.

An adjusting rod 25 is attached at its forward end to the wheel arch and extends over the frame arch 24, to which latter it is adjustably secured by means of a suitable clamp 26. By means of the rod 25, the frames 1—5 may be adjusted with relation to the wheel and thus the height of the handles and the depth of penetration of the cultivator teeth may be adjusted.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a garden tool, the combination with a wheeled frame, of a reversible frame attached thereto, cultivator teeth and a hoe carried by the reversible frame, and a latch device mounted on one of said frames and engaging the other frame for holding said reversible frame in either working position to which it may be adjusted.

2. In a garden tool, the combination with a forward frame, of a reversible frame revolubly connected therewith, means for locking said reversible frame, and cultivator teeth and a hoe carried by said reversible frame and projecting respectively in opposite directions therefrom.

3. The combination with a forward frame, of a V-shaped reversible frame pivotally connected at its apex thereto and having slots, means for holding said V-shaped frame in adjusted position, cultivator teeth adjustably secured to said V-shaped slotted frame, and a scraper attached at its ends to the ends of the V-shaped reversible frame.

4. In a garden tool, the combination with a forward frame, of a V-shaped reversible frame, said V-shaped frame having a pintle at its apex mounted in the forward frame, lateral pintles on the V-shaped frame removably mounted in the forward frame, a latch between said frames, and soil engaging devices carried by the V-shaped frame above and below the same.

5. In a garden tool, the combination with a forward frame, a reversible frame attached thereto, and soil engaging devices carried by said reversible frame above and below the same, of a wheeled arch having rearwardly projecting arms pivotally connected with the forward frame, a frame arch attached to respective sides of the forward frame, handle bars connected at their forward ends to the forward end of the forward frame and attached to said frame arch, an adjusting rod secured to the wheeled arch and extending past the frame arch, and means for adjustably securing said rod to the frame arch.

In testimony whereof, I have signed this specification in the presence of two subscribing witnesses.

JAMES G. ALEXANDER.

Witnesses:
S. A. KNAPP,
E. F. BURTON.

Copies of this patent may be obtained for five cents each, by addressing the "Commissioner of Patents Washington, D. C."